United States Patent
Bhogal et al.

(10) Patent No.: US 9,348,650 B2
(45) Date of Patent: *May 24, 2016

(54) DETERMINING AN OPTIMAL COMPUTING ENVIRONMENT FOR RUNNING AN IMAGE BASED ON PERFORMANCE OF SIMILAR IMAGES

(71) Applicant: International Business Machines Corporation, Armonk, NY (US)

(72) Inventors: Kulvir S. Bhogal, Pflugerville, TX (US); Gregory J. Boss, Saginaw, MI (US); Nitin Gaur, Round Rock, TX (US); Andrew R. Jones, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 218 days.

This patent is subject to a terminal disclaimer.

(21) Appl. No.: 14/018,961

(22) Filed: Sep. 5, 2013

(65) Prior Publication Data

US 2014/0007130 A1  Jan. 2, 2014

Related U.S. Application Data

(63) Continuation of application No. 13/004,049, filed on Jan. 11, 2011, now Pat. No. 8,572,623.

(51) Int. Cl.
*G06F 9/46* (2006.01)
*G06F 9/455* (2006.01)
(Continued)

(52) U.S. Cl.
CPC .............. *G06F 9/50* (2013.01); *G06F 11/3433* (2013.01); *G06F 11/3428* (2013.01); *G06F 11/3457* (2013.01); *G06F 2201/815* (2013.01)

(58) Field of Classification Search
None
See application file for complete search history.

(56) References Cited

U.S. PATENT DOCUMENTS 6,920,555 B1  7/2005 Peters et al.
7,574,496 B2  8/2009 McCrory et al.
(Continued)

FOREIGN PATENT DOCUMENTS

CN    101493781 A   7/2009
JP    2005234917 A  9/2005
(Continued)

OTHER PUBLICATIONS

Tanya Novo-Verde, International Search Report, International Application No. PCT/CA2012/050014, Date of Mailing May 25, 2012.*

(Continued)

*Primary Examiner* — Abdullah Al Kawsar
*Assistant Examiner* — Bradley Teets
(74) *Attorney, Agent, or Firm* — William H. Hartwell; Maxine L. Barasch; Keohane & D'Alessandro PLLC

(57) ABSTRACT

Aspects of the present invention provide an approach that evaluates a locally running image (e.g., such as that for a virtual machine (VM)) and determines if that image could run more efficiently and/or more effectively in an alternate computing environment (e.g., a cloud computing environment). Specifically, embodiments of the present invention evaluate the local (existing/target) image's actual and perceived performance, as well as the anticipated/potential performance if the image were to be migrated to an alternate environment. The anticipated/potential performance can be measured based on another image that is similar to the existing/target image but where that image is running in a different computing environment. Regardless, the system would display a recommendation to the end user if it were determined that the image could perform better in the alternate environment (or vice versa).

17 Claims, 6 Drawing Sheets

(51) Int. Cl.
*G06F 9/50* (2006.01)
*G06F 11/34* (2006.01)

(56) References Cited

U.S. PATENT DOCUMENTS

| | | | |
|---|---|---|---|
| 7,765,231 | B2 | 7/2010 | Rathus et al. |
| 7,904,540 | B2 | 3/2011 | Hadad et al. |
| 7,996,525 | B2 | 8/2011 | Stienhans et al. |
| 8,108,855 | B2 | 1/2012 | Dias et al. |
| 8,190,740 | B2 | 5/2012 | Stienhans et al. |
| 8,239,526 | B2 | 8/2012 | Simpson et al. |
| 8,255,529 | B2 | 8/2012 | Ferris et al. |
| 8,572,623 | B2 * | 10/2013 | Bhogal et al. ............ 718/104 |
| 2005/0155033 | A1 | 7/2005 | Luoffo et al. |
| 2005/0193227 | A1 | 9/2005 | Nakahara et al. |
| 2006/0195715 | A1 | 8/2006 | Herington |
| 2006/0251339 | A1 | 11/2006 | Gokturk et al. |
| 2008/0163194 | A1 | 7/2008 | Dias et al. |
| 2009/0144393 | A1 | 6/2009 | Kudo |
| 2009/0175509 | A1 | 7/2009 | Gonion et al. |
| 2009/0293056 | A1 | 11/2009 | Ferris |
| 2009/0300607 | A1 | 12/2009 | Ferris et al. |
| 2009/0300608 | A1 | 12/2009 | Ferris et al. |
| 2010/0017801 | A1 | 1/2010 | Kundapur |
| 2010/0050172 | A1 | 2/2010 | Ferris |
| 2010/0058328 | A1 | 3/2010 | DeHaan |
| 2010/0114867 | A1 | 5/2010 | Olston |
| 2010/0191845 | A1 | 7/2010 | Ginzton |
| 2010/0250744 | A1 | 9/2010 | Hadad et al. |
| 2010/0306377 | A1 | 12/2010 | DeHaan et al. |
| 2011/0214123 | A1 | 9/2011 | Lublin et al. |
| 2011/0219372 | A1 | 9/2011 | Agrawal et al. |
| 2011/0225277 | A1 | 9/2011 | Freimuth et al. |
| 2011/0314466 | A1 | 12/2011 | Berg et al. |
| 2011/0321058 | A1 | 12/2011 | Schmidt |
| 2012/0005346 | A1 | 1/2012 | Burckart et al. |
| 2012/0042061 | A1 | 2/2012 | Ayala et al. |
| 2012/0054731 | A1 | 3/2012 | Aravamudan et al. |
| 2012/0084414 | A1 | 4/2012 | Brock et al. |
| 2012/0084445 | A1 | 4/2012 | Brock et al. |
| 2012/0180041 | A1 | 7/2012 | Fletcher |

FOREIGN PATENT DOCUMENTS

| | | | |
|---|---|---|---|
| JP | 2006244481 | A | 9/2006 |
| JP | 2007518169 | A | 7/2007 |
| JP | 2009134687 | A | 6/2009 |

OTHER PUBLICATIONS

Miller, G., "Researchers pit local vs. cloud clusters in compute-intensive race", www.fiercebiotechit.com, Aug. 30, 2010, 2 pages.

Bias, R., "Virtual Server vs. Real Server Disk Drive Speed", www.cloudscaling.com, Dec. 13, 2009, 5 pages.

Fontana, J., "Microsoft melding view of local, cloud-based virtual machines", www.networkworld.com, Apr. 29, 2009, 2 pages.

Maitland, J., "Keeping Control Isn't Easy", Chapter 4: Cloud-Based Infrastructure, SearchCloudComputing.com, 13 pages, Apr. 1, 2014.

Mell et al., "The NIST Definition of Cloud Computing", National Institute of Standards and Technology, Information Technology Laboratory, Version 15, Oct. 7, 2009, 2 pages.

Tanya Novo-Verde, International Search Report, International Application No. PCT/CA2012/050014, Date of Mailing May 25, 2012, 4 pages.

Kim et al., "Investigating the Use of Autonomic Cloudbursts for High-Throughput Medical Image Registration", 10th IEEE/ACM International Conference on Grid Computing, pp. 34-41, 2009.

Nordin et al., "Cloud Resource Broker in the Optimization of Medical Image Retrieval System", IEEE 2011, 5 pages.

Yang et al., "NIR: Content Based Image Retrieval on Cloud Computing", IEEE 2009, 4 pages.

Teets, Bradley A., USPTO Office Action, U.S. Appl. No. 13/004,049, Date Mailed Nov. 7, 2012, 23 pages.

Teets, Bradley A., USPTO Final Office Action, U.S. Appl. No. 13/004,049, Date Mailed Mar. 1, 2013, 32 pages.

Teets, Bradley A., USPTO Notice of Allowance and Fee(s) Due, U.S. Appl. No. 13/004,049, Date Mailed Jun. 20, 2013, 28 pages.

Maitland, J., "Keeping Control Isn't Easy", Chapter 4: Cloud-Based Infrastructure, SearchCloudComputing.com, Publication Date: Oct. 2009, 17 pages.

Kim et al., "Investigating the Use of Autonomic Cloudbursts for High-Throughput Medical Image Registration", 10th IEEE/ACM International Conference on Grid Computing, 2009, pp. 34-41.

Etsuji Okada, "Information Materials for IDS", Date of JPO Office Action Sep. 8, 2015, 3 pages.

Schmidt et al., "Efficient Distribution of Virtual Machines for Cloud Computing", IEEE 2010, 8 pages.

Xiao Qi Zhi, "Information Materials for IDS", CN Office Action Dated Jul. 28, 2015, 4 pages.

* cited by examiner

DETERMINING AN OPTIMAL COMPUTING ENVIRONMENT FOR RUNNING AN IMAGE BASED ON PERFORMANCE OF SIMILAR IMAGES

CROSS-REFERENCE TO RELATED APPLICATION

The present patent application is a continuation of U.S. patent application Ser. No. 13/004,049, filed Jan. 11, 2011, entitled "DETERMINING AN OPTIMAL COMPUTING ENVIRONMENT FOR RUNNING AN IMAGE", the disclosure of which is incorporated herein by reference.

TECHNICAL FIELD

The present invention relates to environment optimization. Specifically, the present invention relates to determining an optimal environment for running an image such as that for a virtual machine (VM).

BACKGROUND

The cloud computing environment is an enhancement to the predecessor grid environment, whereby multiple grids and other computation resources may be further abstracted by a cloud layer, thus making disparate devices appear to an end-consumer as a single pool of seamless resources. These resources may include such things as physical or logical compute engines, servers and devices, device memory, and storage devices.

When attempting to locally run a virtual image (e.g., for a VM), a user may occasionally have an undesirable experience because the user may experience sub-optimal performance (e.g., insufficient CPU performance, insufficient memory, etc). Moreover, challenges exist with current approaches for identifying an optimal environment for running a VM.

SUMMARY

Aspects of the present invention provide an approach that evaluates a locally running image (e.g., such as that for a virtual machine (VM)) and determines if that image could run more efficiently and/or more effectively in an alternate computing environment (e.g., a cloud computing environment). Specifically, embodiments of the present invention evaluate the local (existing/target) image's actual and perceived performance, as well as the anticipated/potential performance if the image were to be migrated to an alternate environment. The anticipated/potential performance can be measured based on another image that is similar to the existing/target image but where that image is running in a different computing environment. Regardless, the system would display a recommendation to the end user if it were determined that the image could perform better in the alternate environment (or vice versa). It is understood that performance is just one illustrative metric for which the system would perform a comparison. Other metrics such as cost, reliability, availability, etc. could also be used.

A first aspect of the present invention provides a method for determining an optimal computing environment for running an image, comprising: registering a set of images with a registry service, each of the set of images running in a respective computing environment; measuring an existing performance of a current image running in a current computing environment; identifying at least one image similar to the current image from the set of images; measuring a potential performance of the at least one image as running in its respective computing environment; comparing the potential performance of the at least one image to the existing performance of the current image; and determining an optimal computing environment for running the current image based on the comparing.

A second aspect of the present invention provides a system for determining an optimal computing environment for running an image, comprising: a bus; a processor coupled to the bus; and a memory medium coupled to the bus, the memory medium comprising instructions to: register a set of images with a registry service, each of the set of images running in a respective computing environment; measure an existing performance of a current image running in a current computing environment; identify at least one image similar to the current image from the set of images; measure a potential performance of the at least one image as running in its respective computing environment; compare the potential performance of the at least one image to the existing performance of the current image; and determine an optimal computing environment for running the current image based on the comparison.

A third aspect of the present invention provides a computer program product for determining an optimal computing environment for running an image, the computer program product comprising a computer readable storage media, and program instructions stored on the computer readable storage media, to: register a set of images with a registry service, each of the set of images running in a respective computing environment; measure an existing performance of a current image running in a current computing environment; identify at least one image similar to the current image from the set of images; measure a potential performance of the at least one image as running in its respective computing environment; compare the potential performance of the at least one image to the existing performance of the current image; and determine an optimal computing environment for running the current image based on the comparison.

A fourth aspect of the present invention provides a method for deploying a system for determining an optimal computing environment for running an image, comprising: providing a computer infrastructure being operable to: register a set of images with a registry service, each of the set of images running in a respective computing environment; measure an existing performance of a current image running in a current computing environment; identify at least one image similar to the current image from the set of images; measure a potential performance of the at least one image as running in its respective computing environment; compare the potential performance of the at least one image to the existing performance of the current image; and determine an optimal computing environment for running the current image based on the comparison.

BRIEF DESCRIPTION OF THE DRAWINGS

These and other features of this invention will be more readily understood from the following detailed description of the various aspects of the invention taken in conjunction with the accompanying drawings in which.

Figure 1:
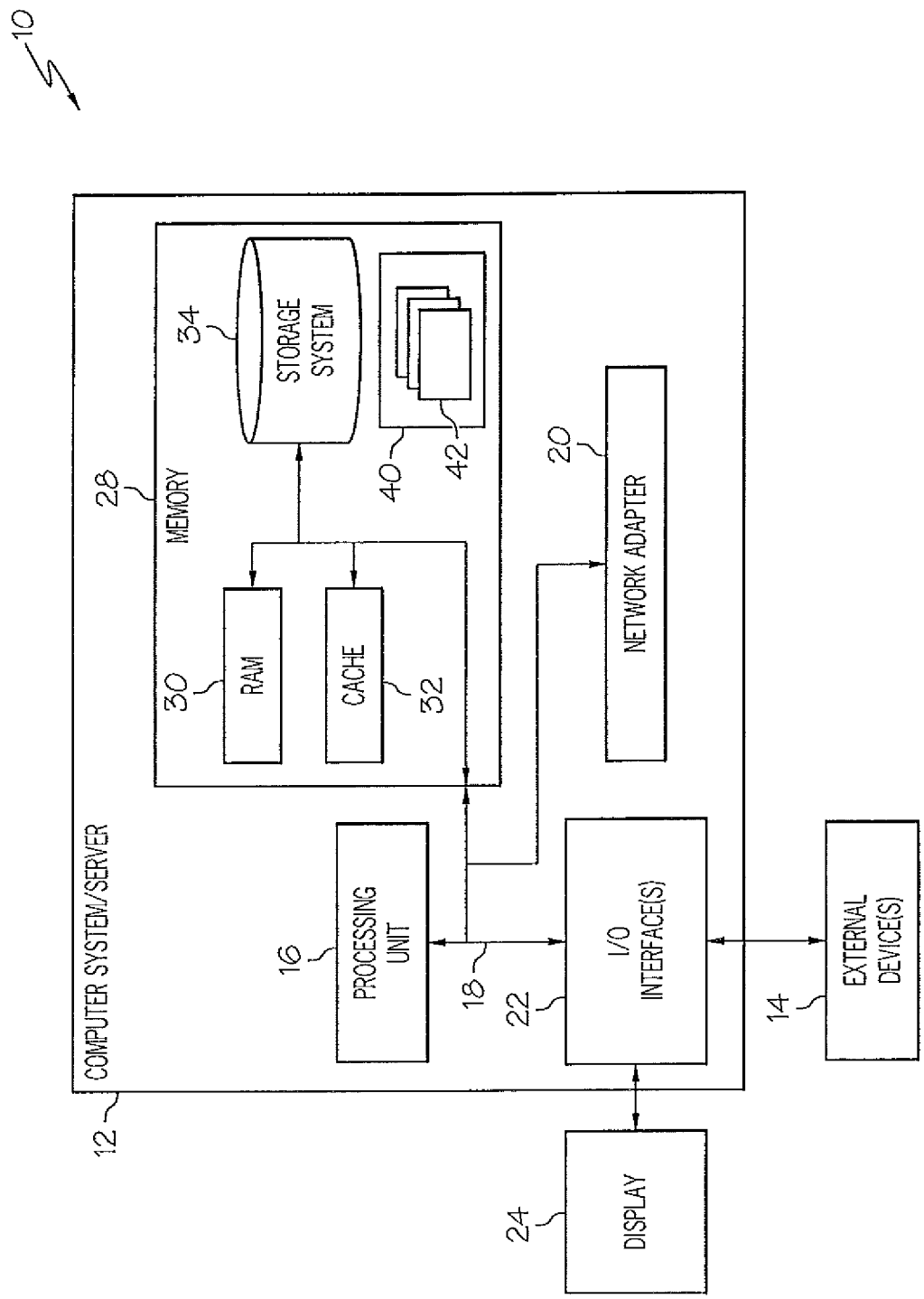
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Aspects of the present invention provide an approach that evaluates a locally running image (e.g., such as that for a virtual machine (VM)) and determines if that image could run more efficiently and/or more effectively in an alternate computing environment (e.g., a cloud computing environment). Specifically, embodiments of the present invention evaluate the local (existing/target) image's actual and perceived performance, as well as the anticipated/potential performance if the image were to be migrated to an alternate environment. The anticipated/potential performance can be measured based on another image that is similar to the existing/target image but where that image is running in a different computing environment. Regardless, the system would display a recommendation to the end user if it were determined that the image could perform better in the alternate environment (or vice versa). It is understood that performance is just one illustrative metric for which the system would perform a comparison. Other metrics such as cost, reliability, availability, etc. could also be used.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Environment optimization program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
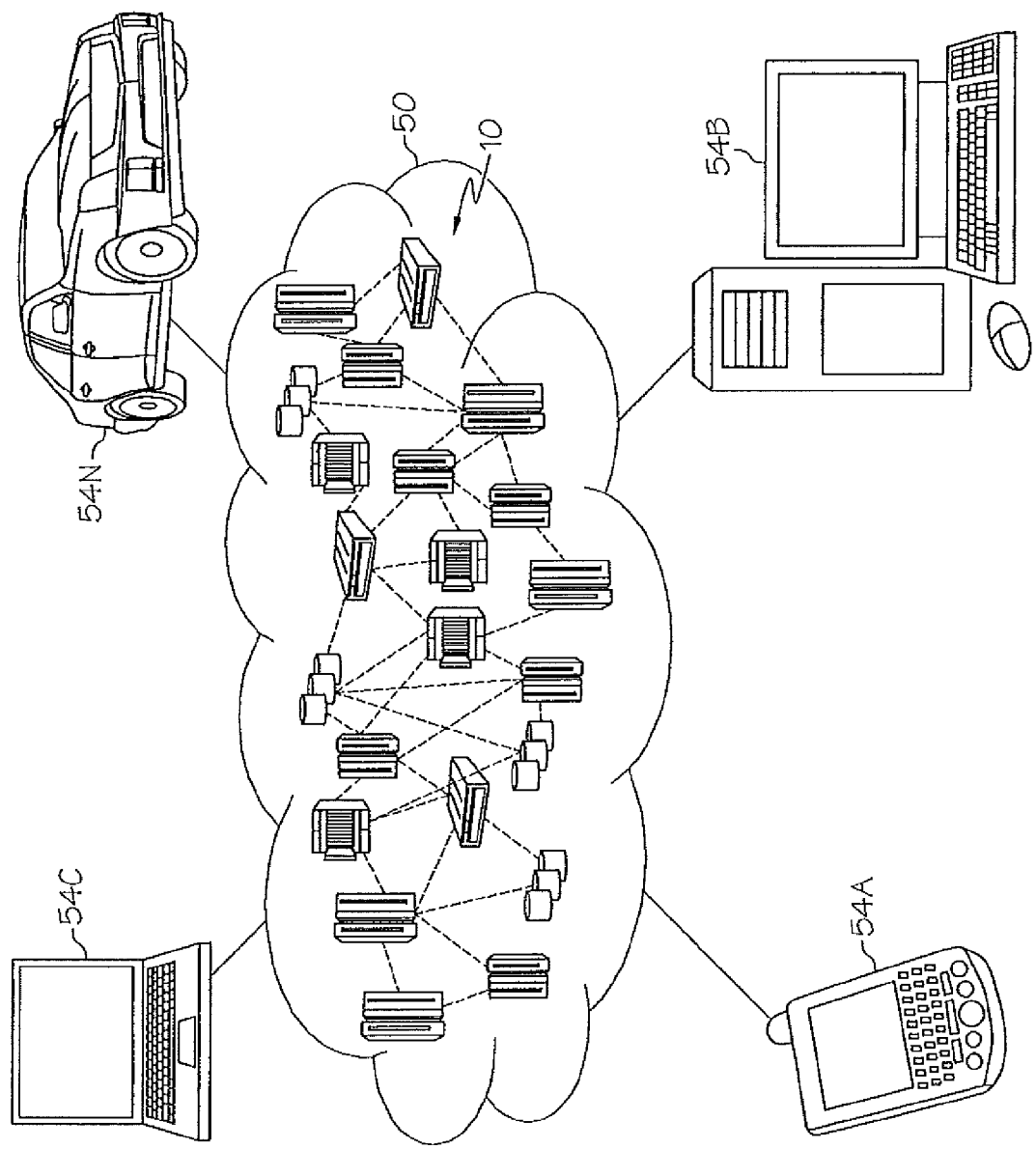
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
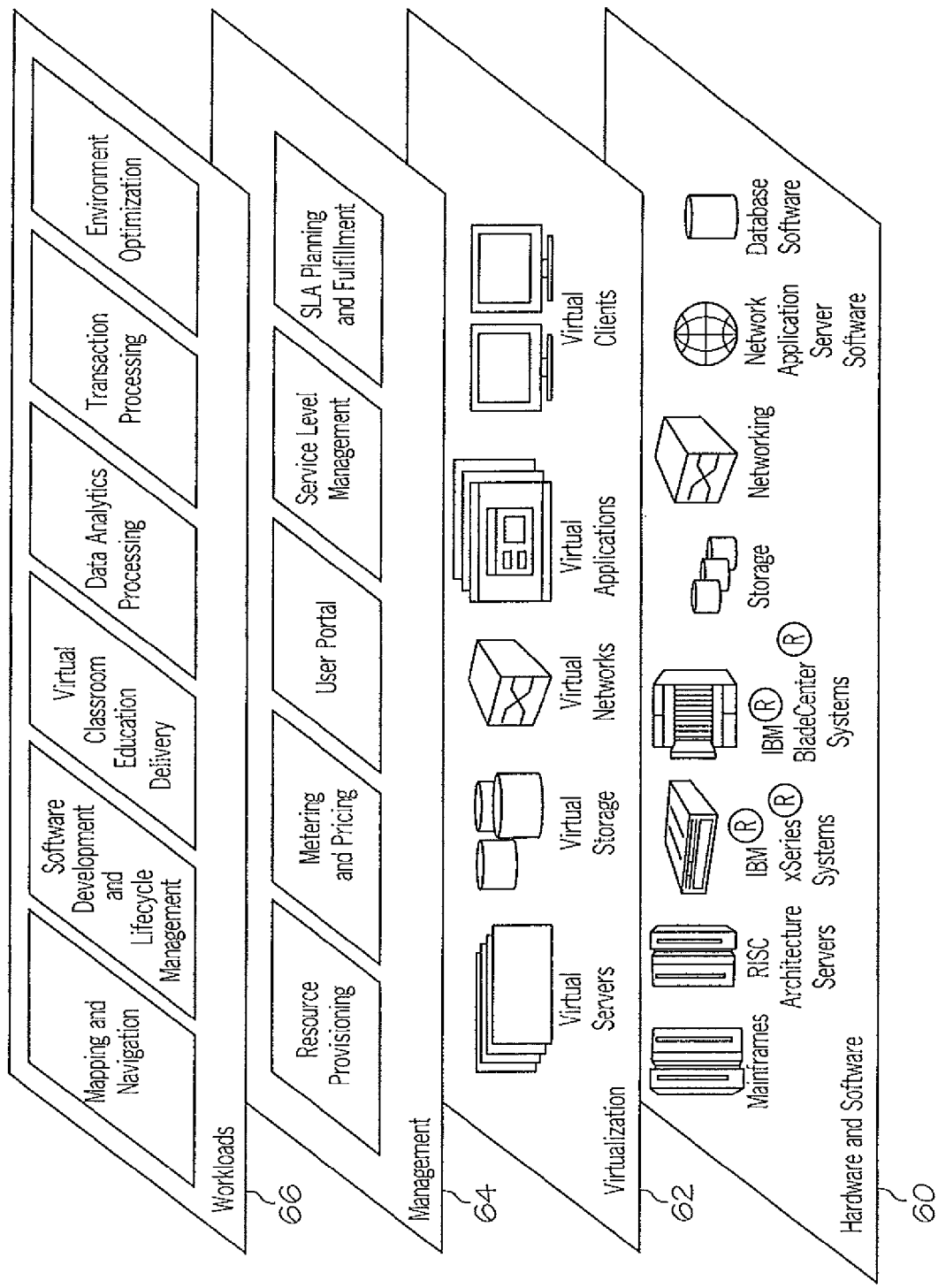
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and environment optimization. As mentioned above, all of the foregoing examples described with respect to FIG. 3 are illustrative only, and the invention is not limited to these examples.

It is understood all functions of the present invention as described herein typically may be performed by the environment optimization function, which can be tangibly embodied as modules of program code 42 of environment optimization program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

In one embodiment, the present invention leverages a cloud-based approach of for powering and/or implementing virtual images (e.g., corresponding to VMs) to provide a user with an improved performance beyond that which s available by running a virtual image locally. These concepts enable an approach for determining the most cost-effective and optimally performing runtime environment to run a virtual image. Among other features, embodiments of the present invention can provide one or more of the following: an approach to measure actual and perceived performance of a locally run virtual machine from an end user's perspective; an approach to measure actual and anticipated performance of a locally run image if it were to be moved to an alternate environment such as a cloud computing environment; and/or a comparison engine to evaluate exact and similar images and which incorporates factors such as network latencies (e.g., cloud vs. locally run), perceived performance differences, and/or cost difference as well as other metrics.

Figure 4:
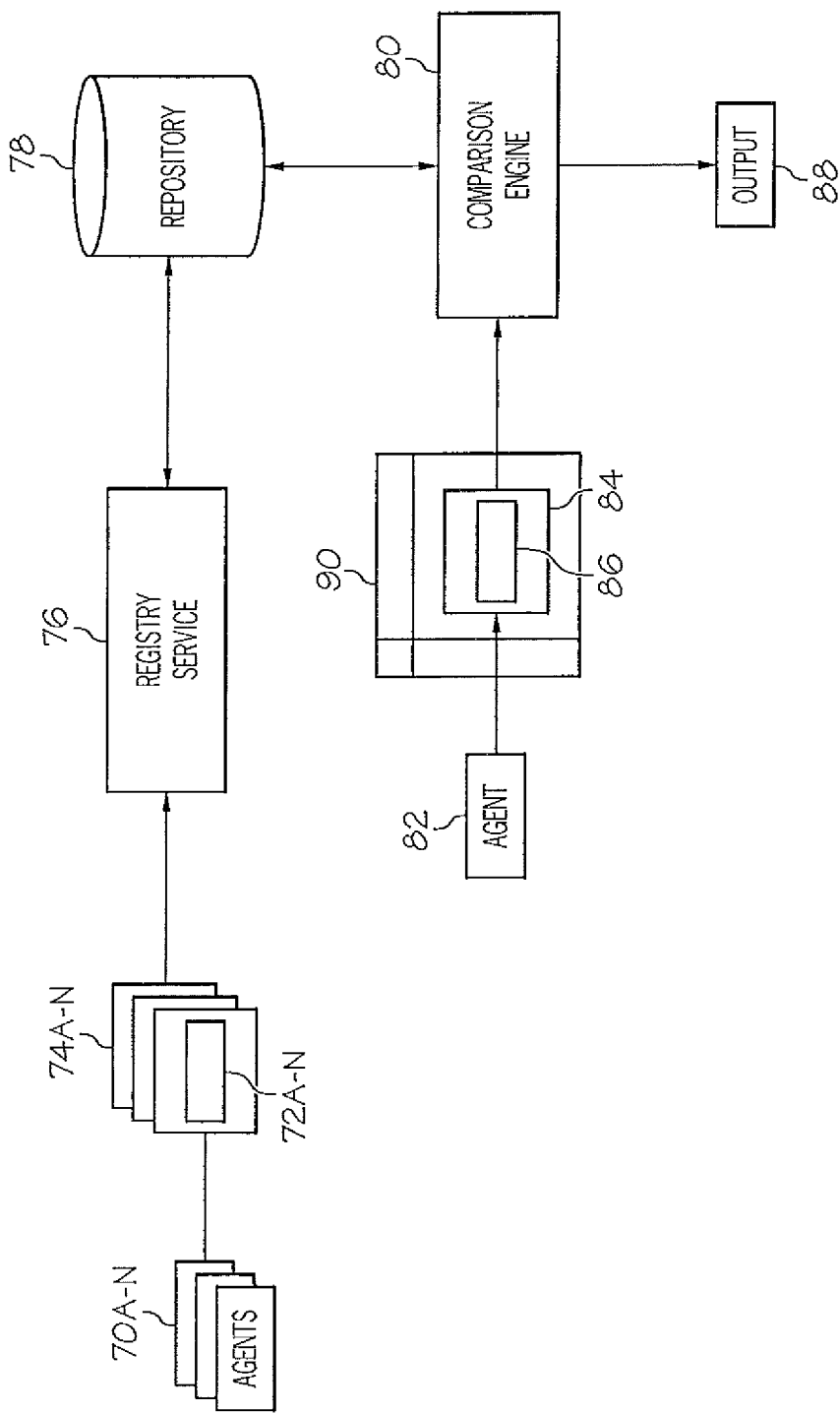
FIG. 4 depicts a component flow diagram according to an embodiment of the present invention.

Referring now to FIG. 4, a component flow diagram according to en embodiment of the present invention is shown. It is understood that in a typical embodiment, the term "image" pertains to a VM. However, this need not be the case. Regardless, as shown in FIG. 4, a set (at least one) of images 72A-N located on a set of workstations 74A-N is registered with a registry service 76, and corresponding details of such registration are stored in repository/registry 78. In general, each of the set of images 72A-N is running in a respective computing environment. The components shown in FIGS. 4-5 will determine whether an image 86 is running in an optimal computing environment, and if not, migrate, copy or otherwise move image 86 to an optimal computing environment. In a typical embodiment, registry service 76 creates a unique identifier that can be associated with an image or image profile. Image registry agents 70A-N and 82 running on workstations 74A-N and 82 (respectively) provide image profiles to registry service 76, which will be used by comparison engine 80 as will be further described below.

Image registry agents 70A-N and 82 may be implemented as a unique service or as part of the virtual environment. This would run both on the local virtual environment as well as the multi-tenant environment that utilizes the system. Either when creating a virtual image, running a virtual image, or as a specific action executed by a user or administrator, the agent works with the registry service to generate a unique identifier for the image, and loads image-specific information into the registry.

Either by a specific action of the user or as an action of the user's local virtual environment, when a virtual image is launched, image registry agents 70A-N and 82 can query registry service 76 to find the same or like images that may be hosted in a multi-tenant (public/private cloud) environment. If an environment is found, comparison engine 80 can be requested to provide feedback on the best environment to execute the image (as will be described in greater detail below). The user's machine specifications will be gathered and uploaded to a comparison service (this could be done at this time in the process or prior to as part of a registration process). This service will compare the user's machine specifications against the specifications offered by the alternate computing environment(s).

Specifically, comparison engine 80 analyzes available profiles from repository 78 with a current/local image 86 running on a workstation 84 in a current computing environment 90; measures an existing performance of current image 86; identifies at least one image similar to the current image from the set of images 72A-N; measures a potential performance of the at least one image as running in its respective computing environment; compares the potential performance of the at least one image to the existing performance of the current image 86; determines an optimal computing environment for running the current image 86 based on the comparing; and/or generated output 88 or the like for a user and/or administrator. In making a determination, comparison engine 80 can providing a ranking of environments to run current image 86.

It is understood that in measuring the existing performance of image 86 in computing environment 90 and its potential performance in other environments, a set of performance metrics could be utilized (e.g., metrics could include, among other things, processing speed, storage capacity, etc.) It is further understood that in addition to performance, comparison engine 80 can utilize other factors/data in making its determination. This could include, among other things:

End user response times for activities (e.g. executing a specific action). This could be measured in real time or gathered from historical data. A client program could execute these common actions, gather, and record this information to the comparison engine.

Latency between cloud providers and locations from which the user may potentially run the image. Note, the user may be planning to run from a customer location in a remote city, so the user could provide that in the request and a cloud provider in a location closer to that location may provide better latency.

User specified weights for inputs into the comparison service. A user may define network latency as a higher priority than raw compute power.

Data entered by the user (or other users in a social network) specific to an image (and the image's unique identifier) regarding the actual performance statistics to be used by the comparison engine.

Rating data that the user provides based upon local and/or cloud experiences with a specific image or in general. This data could be utilized by the comparison engine as a parameter. Using the above capability of a user prioritizing comparison factors, a user may choose to prioritize this factor as high, medium, or low (or some similar type of scale).

As indicated above, a report or other output 88 can be generated by comparison engine 80 that will inform the user of what type of performance benefits they can anticipate by running the image remotely in the cloud as opposed to locally on their local machine. A ranking of the environments compared can be provided. Additional information about the onboarding/provisioning process could be provided as well.

As part of the output 88, the end user can be provided with the option to run the image either locally or remotely. If the remote option is chosen, an appropriate clone of the virtual image can be provisioned and the user can be provided with the information they need to connect remotely to the cloud-based image. Alternatively, if the selected environment is an import version of the exact image the user has, that image can be moved to the cloud provider and an instance provisioned for the user.

As indicated above, the comparison engine 80 can also consider a user profile associated with the system that defines user preferences that are utilized in various stages of the system and its methods. The profile may contain data such as: priorities for comparison parameters (e.g. prioritize cost over performance, network latency over memory availability, etc); and/or preferences for environment providers, and other data that can be used. This system may be part of the registry service 76, comparison engine 80, or as a separate system that is utilized by those services.

Figure 5:
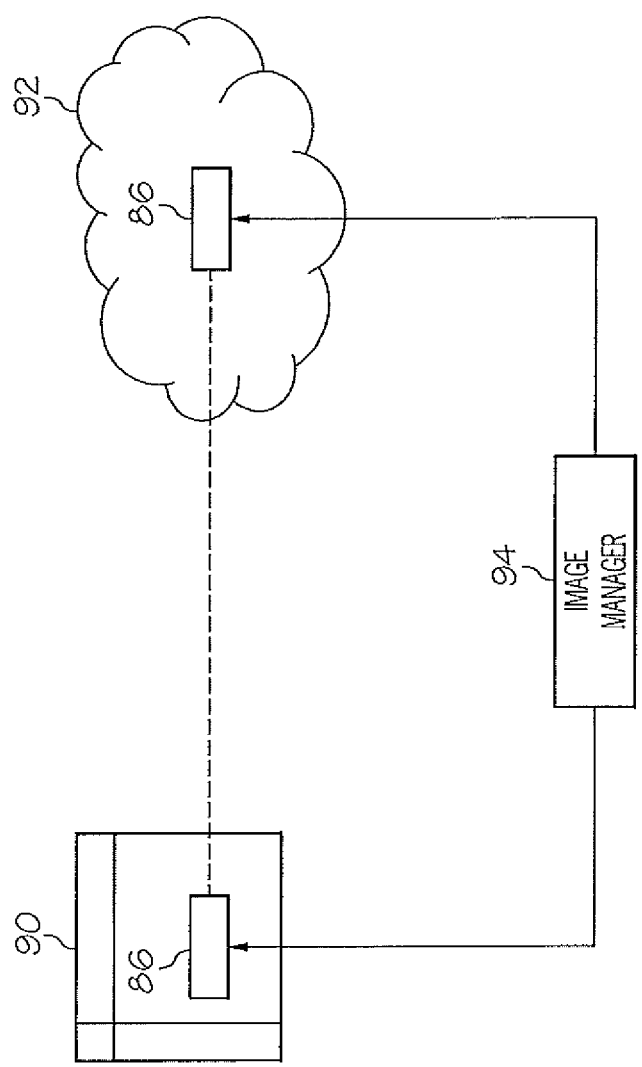
FIG. 5 shows another component flow diagram according to an embodiment of the present invention.

Referring now to FIG. 5, the implementation of current image 86 in an optimal computing environment is shown. Specifically, as shown, an image manager can clone, move, and/or or build current image 86 in the chosen environment (if local is not the most optimal environment). In this example, image 86 is copied by image manager 94 from its grid computing environment 90 to a cloud computing environment 92. Once copied, the current image can be left dormant in the grid computing environment, or removed entirely by image manager 94.

It is understood that the components shown in FIGS. 4-5 (e.g., registry service 76, comparison engine 80, and image manager 94) can be implemented as one or more program modules 42 of environment optimization program 40 shown in FIG. 1. Along these lines, there are multiple possible implementations of the above system and methods. For example, registry service 76 and comparison engine 80 could be separate entities in a distributed environment or built as a single process. Other architectures could be used as well. The system could be implemented using standard web services interfaces and programming techniques. As such, the teachings recited herein are not intended to be limited to a specific implementation or deployment architecture.

Nevertheless, the following illustrative example is based on the teachings described in conjunction with FIGS. 4-5:

Assume in this example that user "A" is running operating system "X" on his/her single core 4 GB RAM laptop computer. Further assume that user "A" is running VM "Y" using VM player "Z". In this example, VM "Y" is running rather slowly because the laptop is running out of RAM, and the VM mapping swap file is growing to accommodate running resources. The system has been measuring actual performance degradation of VM "Y" on the laptop and has found that a similar VM is available on a public cloud "1", which would run approximately 70% faster but would cost $0.25/ hour. A dialog box is presented on the laptop indicating these (and possibly other) details and gives user 'A" an option to accept or reject the recommendation to relocate VM "Y" to public cloud "1".

Figure 6:
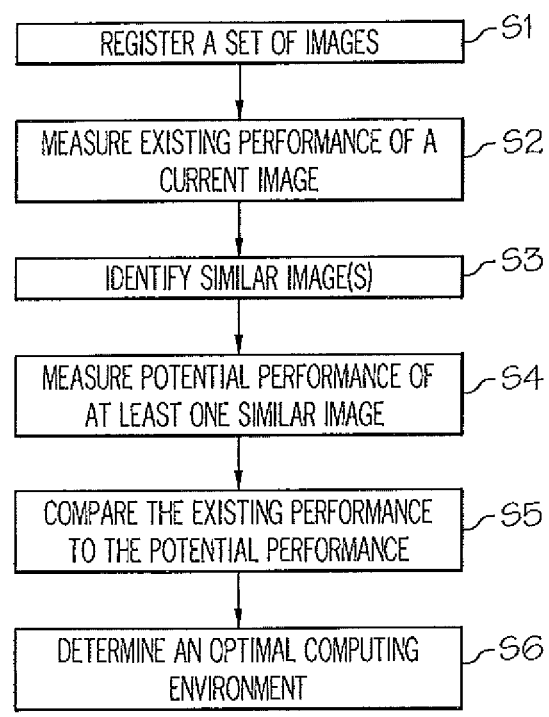
FIG. 6 depicts a method flow diagram according to an embodiment of the present invention.

Referring now to FIG. 6, a method flow diagram according to an embodiment of the present invention is shown. In step S1, a set of images are registered (e.g., by storing corresponding data in a repository) with a registry service (e.g., using image registration agents). As indicated above, each of the set of images is running in a respective computing environment. In step S2, an existing performance of a current image running in a current computing environment is measured (e.g., using performance metrics). In step S3, at least one image similar to the current image is identified from the set of images. In step S4, a potential performance of the at least one image as running in its respective computing environment is measured. In step S5, the potential performance of the at least one image is compared to the existing performance of the current image. In step S6, an optimal computing environment (e.g., a cloud computing environment) for running the current image is determined based on the comparison (and optionally any applicable user profiles that may set forth, among other things, user preferences).

While shown and described herein as an image environment optimization solution, it is understood that the invention further provides various alternative embodiments. For example, in one embodiment, the invention provides a computer-readable/useable medium that includes computer program code to enable a computer infrastructure to provide image environment optimization functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide image environment optimization functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/ or the service provider can receive payment from the sale of advertising content to one or more third parties.

In still another embodiment, the invention provides a computer-implemented method for image environment optimization. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/ driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for determining an optimal computing environment for running an image, comprising:

registering a set of images with a registry service, each of the set of images running in a respective computing environment;

measuring an existing performance of a current image running in a current computing environment based on performance metrics comprising at least one of: processing speed, storage capacity, response time, or latency;

identifying a plurality of images similar to the current image from the set of images;

receiving at least one rating based on user experience relating to actual performance of the plurality of images similar to the current image as the plurality of images are running in each of their respective computing environment;

measuring a potential performance of the plurality of images as running in each of their respective computing environments based on the at least one rating and historical performance data;

comparing the potential performance of the plurality of images in each computing environment to the existing performance of the current image based on the performance metrics as weighted by the user;

ranking the current computing environment and the respective computing environments for running the current image based on the comparison; and determining an optimal computing environment for running the current image based on the ranking; and running the current image in the optimal computing environment.

2. The method of claim 1, the optimal computing environment comprising a cloud computing environment.

3. The method of claim 1, the registering being enabled by an agent running on a set of workstations containing the set of images.

4. The method of claim 1, further comprising storing data associated with the registering in a repository.

5. The method of claim 1, the determining being further based on a user profile associated with the existing image, the user profile setting forth a set of preferences.

6. The method of claim 1, wherein the method is performed by a solution service provider for one or more consumers.

7. A system for determining an optimal computing environment for running an image, comprising:

a bus;

a processor coupled to the bus; and a memory medium coupled to the bus, the memory medium comprising instructions to:

register a set of images with a registry service, each of the set of images running in a respective computing environment;

measure an existing performance of a current image running in a current computing environment based on performance metrics comprising at least one of: processing speed, storage capacity, response time, or latency;

identify a plurality of images similar to the current image from the set of images;

receive at least one rating based on user experience relating to actual performance the plurality of images similar to the current image as the plurality of images are running in each of their respective computing environment;

measure a potential performance of the plurality of images as running in each of their respective computing environments based on the at least one rating and historical performance data;

compare the potential performance of the plurality of images in each computing environment to the existing performance of the current image based on the performance metrics as weighted by the user;

rank the current computing environment and the respective computing environments for running the current image based on the comparison;

determine an optimal computing environment for running the current image based on the ranking; and run the current image in the optimal computing environment.

8. The system of claim 7, the optimal computing environment comprising a cloud computing environment.

9. The system of claim 7, the set of images being registered using an agent running on a set of workstations containing the set of images.

10. The system of claim 7, the memory medium further comprising instructions to store data associated with the registering in a repository.

11. The system of claim 7, the optimal computing environment being further determined based on a user profile associated with the existing image.

12. The system of claim 11, the user profile setting forth a set of preferences.

13. A computer program product for determining an optimal computing environment for running an image, the computer program product comprising a computer readable hardware storage device, and program instructions stored on the computer readable storage media, to:

register a set of images with a registry service, each of the set of images running in a respective computing environment;

measure an existing performance of a current image running in a current computing environment based on performance metrics comprising at least one of: processing speed, storage capacity, response time, or latency;

identify a plurality of images similar to the current image from the set of images;

receive at least one rating based on user experience relating to actual performance of the plurality of images similar to the current image as the plurality of images are running in each of their respective computing environment;

measure a potential performance of the plurality of images as running in each of their respective computing environments based on the at least one rating and historical performance data;

compare the potential performance of the plurality of images in each computing environment to the existing performance of the current image based on the performance metrics as weighted by the user;

rank the current computing environment and the respective computing environments for running the current image based on the comparison;

determine an optimal computing environment for running the current image based on the ranking; and run the current image in the optimal computing environment.

14. The computer program product of claim 13, the optimal computing environment comprising a cloud computing environment.

15. The computer program product of claim 13, the set of images being registered using an agent running on a set of workstations containing the set of images.

16. The computer program product of claim 13, further comprising program instructions stored on the computer readable hardware storage device to store data associated with the registering in a repository.

17. The computer program product of claim 13, the optimal computing environment being further determined based on a user profile associated with the existing image, the user profile setting forth a set of preferences.

* * * * *